(12) United States Patent
Yamaguchi

(10) Patent No.: US 8,341,343 B2
(45) Date of Patent: Dec. 25, 2012

(54) CONTROLLER

(75) Inventor: Kazuhi Yamaguchi, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 281 days.

(21) Appl. No.: 12/952,739

(22) Filed: Nov. 23, 2010

(65) Prior Publication Data

US 2011/0145529 A1 Jun. 16, 2011

(30) Foreign Application Priority Data

Dec. 10, 2009 (JP) ................ 2009-280059

(51) Int. Cl.
*G06F 12/00* (2006.01)
*G06F 12/16* (2006.01)
(52) U.S. Cl. ........... 711/104; 711/162; 711/E12.001; 711/E12.103
(58) Field of Classification Search .......... 711/104, 711/162, E12.001, E12.103
See application file for complete search history.

(56) References Cited

U.S. PATENT DOCUMENTS

2007/0266277 A1* 11/2007 Oyamada ............... 714/718

FOREIGN PATENT DOCUMENTS

| JP | A-9-212429 | 8/1997 |
|---|---|---|
| JP | A-2006-286111 | 10/2006 |

* cited by examiner

*Primary Examiner* — Yong Choe
(74) *Attorney, Agent, or Firm* — Oliff & Berridge, PLC

(57) ABSTRACT

A controller includes a first judging part that judges abnormality of a first memory part, and a second judging part that judges abnormality of a second memory part based on (1) results of comparing with each other data having a same content written in the second memory part multiple times, and (2) a total amount of the data read out from the second memory part, when the first memory part is judged to be abnormal. In addition, a third judging part judges abnormality of the second memory part, based on results of comparing the data written in the second memory part with the data read out from the second memory part.

6 Claims, 4 Drawing Sheets

US 8,341,343 B2

CONTROLLER

BACKGROUND OF THE INVENTION

1. Field of the Invention

The invention relates to a technology that controls controlling subjects.

2. Description of the Background Art

Conventionally, controllers that control controlling subjects have been controlled to implement most suitable control without any effects, e.g. of aged deterioration and of individual differences of the controlling subjects. For example, in the controllers, control values (learning values), taken into account differences of the past between target values of the control and actual measurement values that have actually controlled the controlling subject based on the target value of the control (offset values), are written in non-volatile memory in advance. On the next control, the learning values of the non-volatile memory are loaded into volatile memory, where the controlling subjects are controlled based on learning values of the volatile memory, what is called, learning control is applied.

When controllers implement control, the volatile memory with faster access speed is more suitable than the non-volatile memory as a storage media for deleting and writing of parameters including leaning values. However, the volatile memory has a defect that stored data are lost when electric power is suspended. Therefore, a specific volatile memory (hereinafter referred to as specific memory) is used to implement a speedy control, to which the power is constantly supplied from the power supply even when electric power to the controllers is suspended.

Even such a specific memory in the controller has risks like data are deleted when a line for electric power is taken off at repair or when electric supply is suspended at accidents. Further, there is another risk that electronic noise might cause data abnormality. As a result, the method, writing parameters written in the specific memory into the non-volatile memory as backup data, is applied.

As such a technique, it is known that the backup data at the non-volatile memory are reloaded into the specific memory when abnormalities occur at the specific memory in the controller for example.

However, even the stored data in the non-volatile memory have risks that data abnormalities occur when the non-volatile memory breaks down. As a result, an appropriate control is not implemented if the controlling subjects are controlled by using the abnormal data.

SUMMARY OF THE INVENTION

According to one aspect of the invention, a controller that controls a controlling subject includes a first memory part that stores memory contents while receiving electric power from a power supply, a second memory part that stores the memory contents even while not receiving the electric power from the power supply, a controlling part that controls the controlling subject by using data stored in the first memory part, a backup part that reads the data stored in the first memory part, and that writes the data as backup data in the second memory part, a first judging part that judges abnormality of the first memory part, a second judging part that judges abnormality of the second memory part based on (1) results of comparing with each other data having a same content written in the second memory part multiple times, and (2) a total amount of the data read out from the second memory part, when the first memory part is judged to be abnormal by the first judging part, a third judging part that judges abnormality of the second memory part based on results of comparing the data written in the second memory part with the data read out from the second memory part, a writing part that writes the backup data of the second memory part into the first memory part when the second memory part is not judged to be abnormal by the second judging part, and a prohibiting part that prohibits control of the controlling subject by the controlling part when the second memory part is judged to be abnormal by both the second judging part and the third judging part.

When the second memory part is judged to be abnormal, the backup data in the second memory part are not written down in the first memory part. Therefore, the control of the controlling subject based on abnormal data is avoided.

According to another aspect of the invention, the controller implements an idling stop control through controlling an engine and the prohibiting part prohibits the idling stop control.

The controller is able to prohibit the idling stop control based on abnormal data in an engine mounting vehicle.

According to another aspect of the invention, the backup part writes down data of a number of times of driving of a starter motor stored in the first memory part, into the second memory part.

It allows to prohibit an idling stop control based on abnormal data of the number of times of driving of the starter motor in an engine mounting vehicle.

Therefore, the purpose of the invention is to provide technique that allows prohibiting a control of the controlling subjects based on abnormal data caused by abnormality of the non-volatile memory part.

These and other objects, features, aspects and advantages of the present invention will become more apparent from the following detailed description of the present invention when taken in conjunction with the accompanying drawings.

DESCRIPTION OF THE EMBODIMENTS

The invention relates to a technique that controls controlling subjects and is applied to all technical areas that control the controlling subjects. For convenience, the controller of the vehicle is used as the embodiment and descriptions are conducted referring to the attached drawings.

Typical Embodiment (System Block Diagram)

Figure 1:
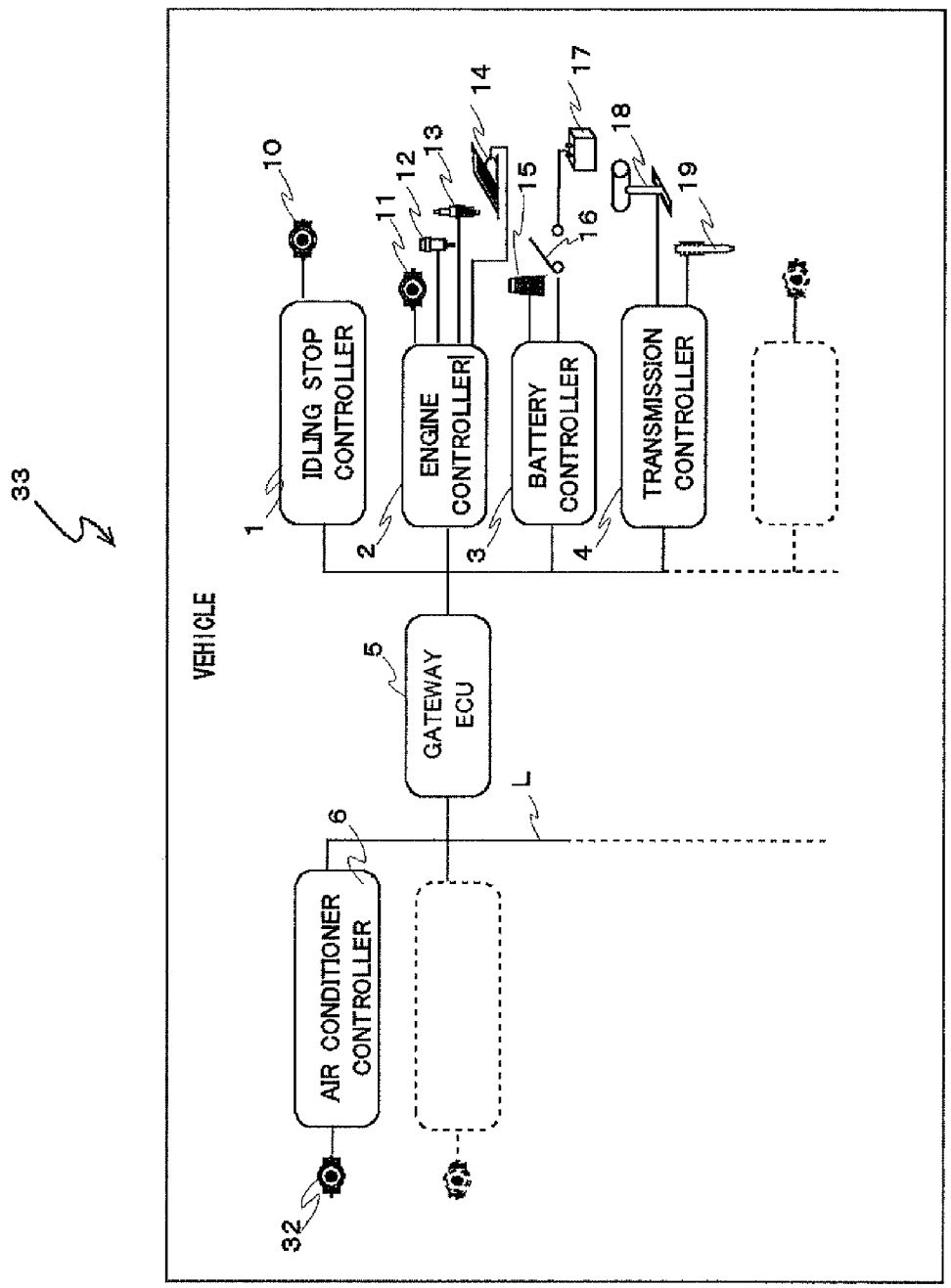
FIG. 1 shows a drawing to explain a vehicle system.

FIG. 1 shows a control system of a vehicle 33 in the typical embodiment. In the control system of the vehicle 33, for example, a plurality of controllers are connected to an in-vehicle network L called CAN (Control Area Network). A plurality of controllers are connected with the controlling subjects controlled by the controllers. These controllers are called ECU (Electronic Control Unit.)

A gateway controller 5 among a plurality of controllers controls traffic of data transmitted in a plurality of in-vehicle networks. A plurality of in-vehicle networks include a power network connected with controllers related to running of the vehicle 33, an information network connected with controllers related to information provision, and a body network connected with controllers related to electrical devices.

Controllers such as an idling stop controller 1, an engine controller 2, a battery controller 3 and a transmission controller 4 are connected among the power network.

In the idling stop controller 1, a controlling part controls a starter motor 10 which is the controlling subject that assists a rotating force of an engine, when a cranking of an engine of the vehicle 33 is controlled based on input values mainly from an engine revolutions sensor. In an engine controller 2, a controlling part controls a throttle motor 11, an injector 12 and a spark plug 13 which are the controlling subjects for controlling an engine torque, based on input values mainly from an accelerator detecting part 14. In a battery controller 3, a controlling part controls a switch 16 which is the controlling subject for a charging and a discharging power, based on input values mainly from a voltage sensor 15, and the like. In a transmission controller 4, a controlling part controls a solenoid 19 which is the controlling subject for changing a gear shift range, based on input values mainly from a gear shift range sensor 18 connected with a shift lever.

An air conditioner apparatus 6 and others are connected in the body network. In the air conditioner apparatus 6, a controlling part controls a motor 32 which is the controlling subject for modulating an air condition in a vehicle cabin, based on input values mainly from a temperature sensor, and the like.

(Controller)

Figure 2:
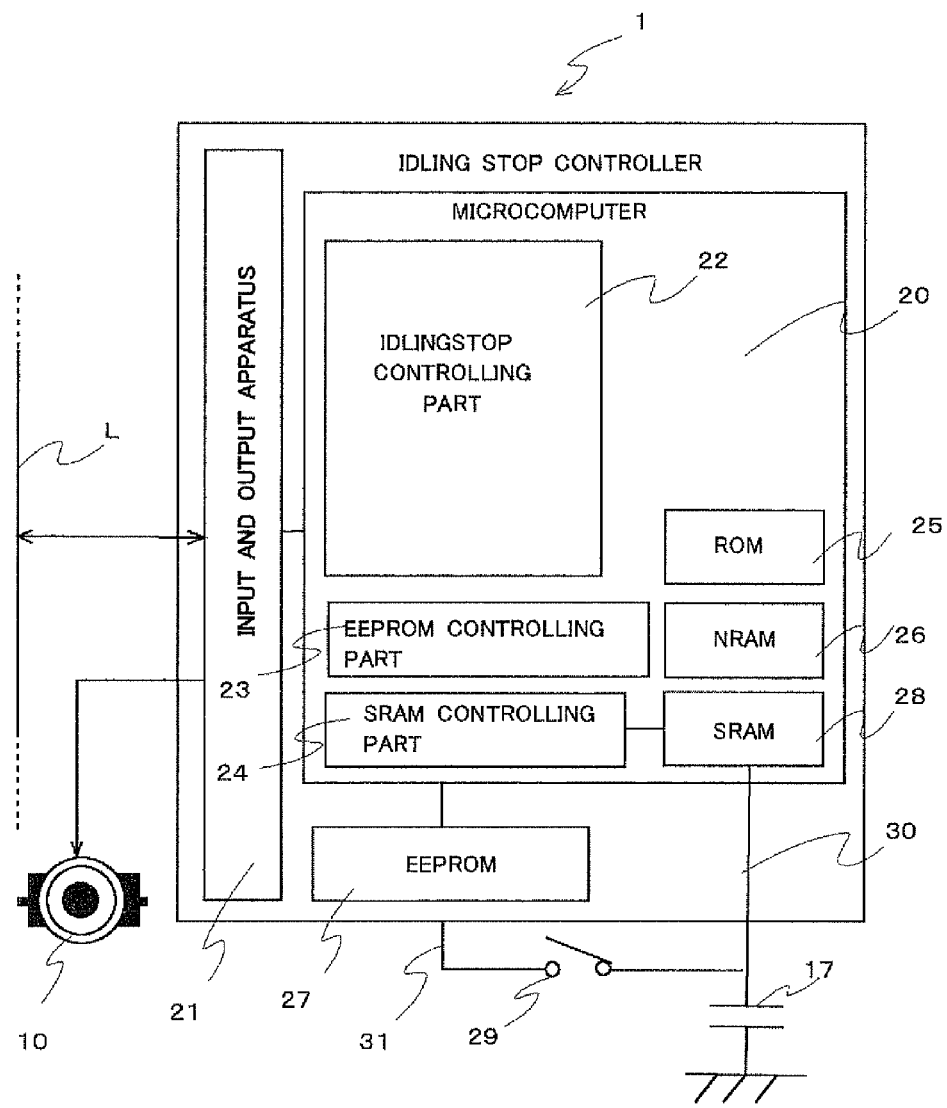
FIG. 2 is a system block diagram of a controller.

FIG. 2 shows a system bock diagram of the idling stop controller 1.

The idling stop controller 1 includes a SRAM (STANDBY RAM) 28, an EEPROM 27, a ROM 25, a NRAM 26, an input and output apparatus 21, and a microcomputer 20 which is a controlling part.

The SRAM 28 is a volatile memory where learning control values and historic control data, and the like, are written. The SRAM 28 is the volatile memory; however, it can retain stored contents while receiving electric power from a power supply 17 when the idling stop controller 1 is not operating.

The EEPROM 27 is a non-volatile memory including a flash memory where backup data like a learning control value or historic control data are written. The EEPROM 27 can retain stored contents even while not receiving the electric power from the power supply when the idling stop controller 1 is not operating.

The ROM 25 is a read only memory that writes a control program for offering an idling stop function.

The NRAM 26 is a volatile memory in which the microcomputer 20 writes values temporally on its operation.

The input and output apparatus 21 is an apparatus that controls input signals that are input into the idling stop controller 1, and output signals that are output to the outside.

The microcomputer 20 which is the controlling part is a computer which offers the idling stop function that controls e.g. the starter motor 10, based on a control program written in the ROM 25, a control parameter written in the NRAM 26 and the SRAM 28, and the input signals provided from e.g. sensors and in-vehicle network L.

The microcomputer 20 which is the controlling part includes an idling stop controlling part 22, an EEPROM controlling part 23 and a SRAM controlling part 24.

The idling stop controlling part 22 implements an idling stop control, which is described later, and provides an idling stop function by collaborating with controlling elements like other electronic parts or controllers.

The EEPROM controlling part 23 implements controls for reading and writing data of the EEPROM 27 via instruction from the idling stop controlling part 22. The controlling part 23 also implements an abnormal judging process in the EEPROM 27 which is described later.

The SRAM controlling part 24 implements controls to read and write data of the SRAM 28 through receiving instruction from the idling stop controlling part 22. The controlling part 24 also implements the abnormal judging process in the SRAM 28 which is described later.

The idling stop controller 1 implements the idling stop function by receiving electric power through a first system 31 from the power supply 17. The first system 31 provides electric power to controllers like the idling stop controller 1 at a start-up of the control system of the vehicle 33 when users operate a user switch 29 like an ignition switch or a push start switch. On the other hand, a second system 30 provides electric power to the SRAM 28 irrespective of an operation of the user switch 29.

(Idling Stop Function)

The idling stop function means an engine control designed to reduce fuel consumption. During processes from the start of the engine by operating of the user switch 29 to the stop of the engine by operating of the user switch 29, the engine stops if conditions are met like the vehicle speed becomes zero and the vehicle 33 stops. And then the engine starts up if conditions are met like users' accelerator operations are detected.

(Idling Stop Function)

Figure 3:
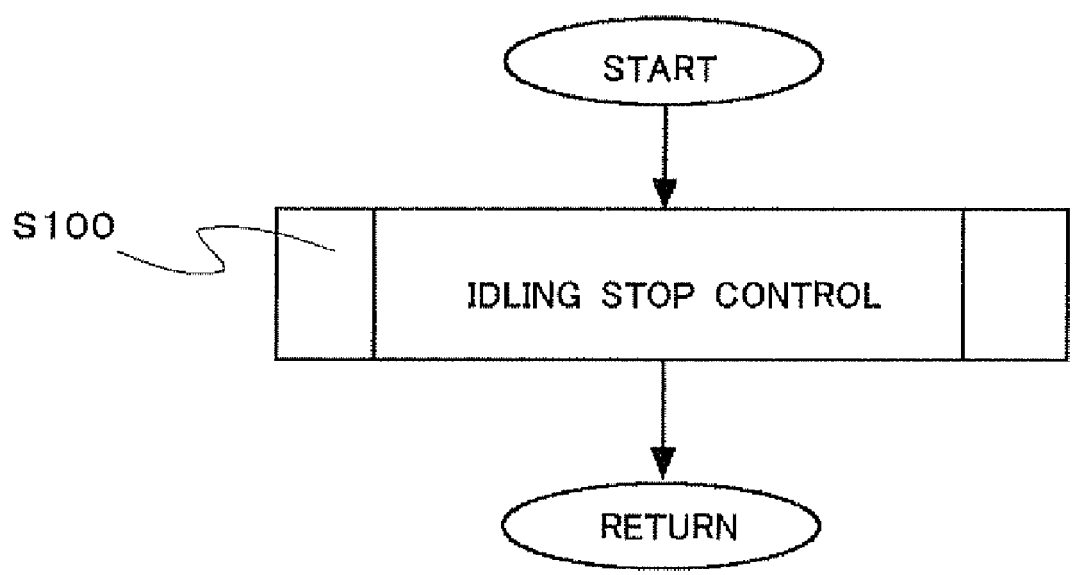
FIG. 3 is a flow chart to explain control.

The idling stop controlling part 22 in the microcomputer 20 in the idling stop controller 1 implements an idling stop control in a step S100 described in FIG. 3. The idling stop control includes an engine stop control under the control of idling stop control and an engine start control under the control of idling stop control. Aside from these controls, during implementing these controls, a control for judging abnormality of data stored in memory (data abnormality judgment control) and a control corresponding to judgment on data abnormality (fail safe control) are implemented.

The idling stop controlling part 22 temporarily writes parameters into the NRAM 26 for utilizing them for the idling stop control. The idling stop controlling part 22 reads the parameters from the NRAM 26 for utilizing them for the idling stop control. When the parameters are optimized ones by the learning control, in other words, when the learning values are the ones that are used at the idling stop control at a next trip, the idling stop controlling part 22 writes the learning values in the SRAM 28 and uses the learning values written in SRAM 28 at the idling stop control at the next trip.

The term "one trip" used here means a time duration from engine start by users' operation of the user switch SW to engine stop by users' operation of the user switch SW.

At an engine start up control under the idling stop control, the idling stop controlling part 22 counts a number of times of driving of a starter motor and then writes it into the SRAM 28 when the idling stop controlling part 22 performs the cranking control of the engine by controlling the starter motor 10. The idling stop controlling part 22 reads out the number of times of driving of the starter motor written in the SRAM 28, and then judges whether the number is over a predetermined number (100,000 times for example), when the idling stop controlling part 22 drives starter motor 10 during the engine start up control. In case the number is judged to be over the predetermined number, it is judged that the starter motor is deteriorated. Therefore, a control (a safe control) to prevent the idling stop control is implemented. On the other hand, when the number is judged to be less than the predetermined number, the idling stop control is not prevented. This promotes safety in vehicle control.

Further, the EEPROM controlling part 23 writes the learning values and the number of times of driving of the starter motor written in the SRAM 28 into the EEPROM 27. That is, the EEPROM controlling part 23 writes the learning values and the number of times of driving of the starter motor written in the SRAM 28 into the EEPROM 27 as backup data.

The reason that the learning values and the number of times of driving of the starter motor are written in the SRAM 28 is that the SRAM 28 can maintain the stored data even during a period between trips when the power from the power supply is not provided to the controllers, because the SRAM 28 is constantly provided the power from the power supply. Further, the SRAM28 has a faster access speed from the idling stop controlling part 22 than the EEPROM 27. In other words, the microcomputer 20 is able to implement the engine start control promptly.

The EEPROM controlling part 23 writes down the data written in the SRAM 28 as backup data. This is because there are risks that a line for electric power might be taken off at repairs or data might be deleted by accidents of shutting the electric power. Further, there is another risk that electronic noise might cause data abnormality. Therefore, the idling stop controlling part 22 writes down data, written in the SRAM 28, into the EEPROM 27 having less such risks, as backup data. In case such risks occur in the SRAM28, the backup data written in the EEPROM 27 can be utilized at the idling control.

(Engine Stop Control)

First, an engine stop control is described.

The engine controller 2 implements the engine stop control to stop the engine when conditions from (1) to (6) below (conditions to stop the engine) are met.

(1) An engine controller 2 judges that a speed of car is zero, based on input signals from a speed sensor.

(2) The engine controller 2 judges that an accelerator is not operating, based on input signals from an accelerator detecting part 14.

(3) The engine controller 2 judges that a brake is operating, based on input signals from a brake sensor.

(4) The engine controller 2 judges that a gear shift range is in a drive range, based on input signals from a transmission controller 4.

(5) The engine controller 2 judges that an electric charge of battery is more than the predetermined ones, based on input signals from the battery controller 3.

(6) Idling control doesn't need to be maintained by other control.

The conditions to control engine start by the idling stop function are not limited to the above conditions. As long as conditions correspond with the purpose of the idling stop, different conditions may be added or any of the above conditions may be deleted.

The engine controller 2 controls the engine to stop by satisfaction of the above conditions. The engine stop control by the idling stop function is implemented by stopping the control of a throttle motor 11, an injector 12 and a spark plug 13, and by making the engine revolutions to zero.

Thus, the engine controller 2 is responsible for partial control of the idling stop control. Therefore the engine controller 2 is considered to be an idling stop controller.

(Engine Start Control)

Next, the engine start control is described.

The idling stop controller 1 implements the engine start control to start the engine by controlling the driving of the starter motor 10 when conditions from (7) to (9) below (conditions to start the engine) are met.

(7) The idling stop controller 1 judges that the accelerator is operating in the status of the idling stop, based on an accelerator operation detecting signal that is input from the engine controller 2.

(8) The idling stop controller 1 judges that the brake is not operating, based on brake operation detecting signals that are input from the engine controller 2.

(9) The idling stop controller 1 judges that the gear shift range is in the drive range, based on input signals from a transmission controller 4.

The conditions to control engine start by the idling stop function are not limited to the above conditions. As long as conditions correspond with the purpose of the idling stop function, different conditions may be added or any of the above conditions may be deleted.

(Data Abnormality Judgment Control)

Figure 4:
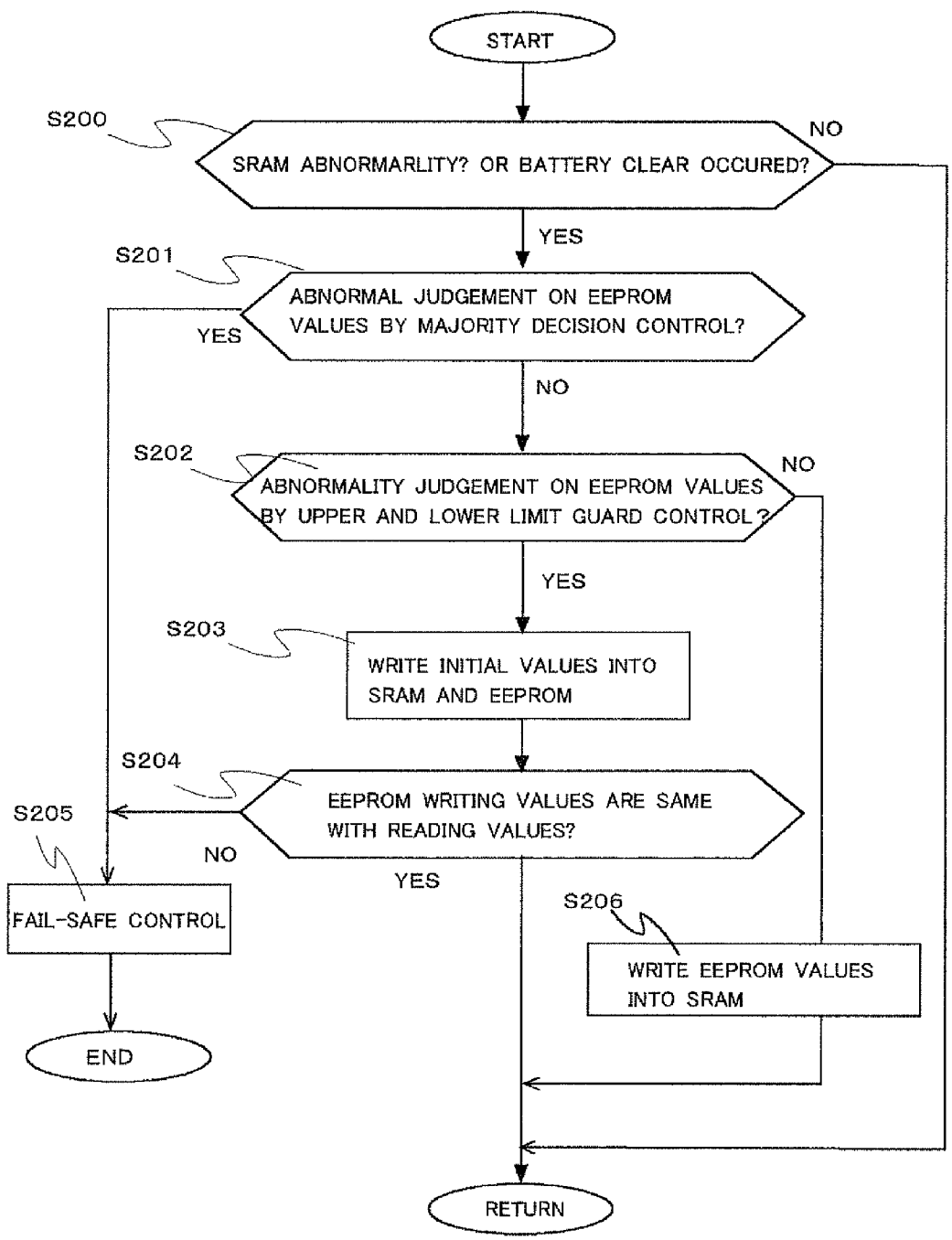
FIG. 4 is a flow chart to explain control.

Aside from the engine stop control and the engine start control at the idling stop control, FIG. 4 describes a data abnormality judgment control that judges abnormality of data stored in memory and used during performing these controls. The data abnormality judgment control is implemented at predetermined cycle in the microcomputer 20 and is completed along with the completion of a vehicle system.

(SRAM Abnormality Judgment Control, Battery Removal Judgment Control))

In a step S200, the SRAM controlling part 24 in the microcomputer 20 in the idling stop controller 1 judges whether it is an SRAM abnormality or not, and judges whether electric power into the SRAM 28 was suspended or not, i.e. whether a battery clear was done or not because of removal of the power supply 17 from the vehicle system. In other words, the SRAM controlling part 24 judges whether data written in the SRAM 28 becomes abnormal by corrupting due to electronic noise effects and whether data written in the SRAM 28 are deleted due to the stop of electric power. When the SRAM controlling part 24 judges that the data written in the SRAM 28 is abnormal or the data are deleted, the step moves to the S201. When the SRAM controlling part 24 does not judge that data written in the SRAM 28 are abnormal nor the data are deleted, in other words, when the data is normal, the status moves to "Return".

(Majority Decision Control)

In a step S201, the EEPROM controlling part 23 in the idling stop controller 1 has written down the same contents of data several times when data is written down in the EEPROM 27. The controlling part 23 also judges whether a plurality of data which are read out from corresponding addresses of the EEPROM 27 coincide with a plurality of data contents which were written at the EEPROM 27. The controlling part 23 judges that the data written in the EEPROM 27 is not abnormal when all of those data coincide, or when part of the data coincide and when the number of data that coincide is more than the number of data that do not coincide. When the controlling part 23 does not judge that the case is abnormal, the step shifts to the step S202.

The controlling part 23 judges that the data written in the EEPROM 27 is abnormal when all of those data do not coincide, or when part of the data coincide and when the number of data that do not coincide is more than the number of data that coincide. When the controlling part 23 judges that the case is abnormal, the step shifts to the step S205.

When the majority control mentioned above is implemented for the data written in the EEPROM 27, even if the data written in the EEPROM 27 get corrupted due to electronic noise effects, only a part of data among a plurality of written data get corrupted in many cases. Therefore, the EEPROM controlling part 23 can read out normal data with no corruption, as well as can judge that the case is abnormal when majority of a plurality of data get garbled into different data.

(Upper and Lower Limit Guard Control)

In a step S202, the EEPROM controlling part 23 in the idling stop controller 1 judges whether a value which added all of the data written in the EEPROM 27 in binary manner is less than a predetermined upper limit and is more than the predetermined lower limit (whether the value is within the predetermined range) or not. In other words, the controlling part judges whether data written in the EEPROM 27 are the predetermined amount of data or not. When the controlling part 23 does not judge that the data written in the EEPROM 27 are the predetermined amount of data, the step shifts to the step S203. When the controlling part 23 judges that the data written in the EEPROM 27 are the predetermined amount of data, the step shifts to the step S206.

In a step S206, the EEPROM controlling part 23 reads out the number of times of driving of the starter motor, back up data stored in the EEPROM 27, and writes them down in the SRAM 28. Then it moves to "Return".

In the idling stop controller 1, such an upper and lower limit guard control is implemented on data written in the EEPROM 27. By performing the upper and lower limit control mentioned above in the idling stop controller 1, it is possible to judge the data abnormality when a plurality of same data written in the EEPROM27 get corrupted in the same way due to electronic noise effects, and when data abnormality was not judged due to majority decision control, and when the amount of data is larger or smaller than predetermined range of data amount.

(Verification Control)

In a step S203, the SRAM controlling part 24 of the microcomputer 20 in the idling stop controller 1 reads out a predetermined value from the ROM 25 (for example, a specific value as test data for a number of times of driving of the starter motor, and a initial value of the learning control.) and writes down the value into the SRAM 28. The EEPROM controlling part 23 reads out the predetermined value from the ROM 25 and writes down the value into the EEPROM 27. Then the step shifts to the step S204.

In a step S204, the EEPROM controlling part 23 reads out data from the same address of the EEPROM 27 where predetermined values are written and judges whether the predetermined values written down coincide with data read out. When it is not judged that the data coincide with each other, the step shifts to the step S205. When it is judged that the data coincide with each other, the step shift to "Return".

Under judgments on the steps S201 and S202, there is possibility of data abnormality that judged data can be corrupted due to electronic noise effects during long elapsed time from the writing to the reading. Therefore, it is not able to be specified whether it is EEPROM abnormality when the EEPROM 27 breaks down or it is just an abnormality of corrupted data. When such as verification control is implemented to the EEPROM 27, the time from writing to reading is sufficiently short, therefore the failure of the EEPROM 27 can be specified.

(Failsafe Control)

In a step S205, the idling stop controlling part 22 prohibits an idling stop control because of failure of the EEPROM 27, i.e. EEPROM's abnormality.

In the idling stop control, it becomes possible to judge the deterioration of the starter motor 10 by prohibition of the idling stop control when the number of times of driving of the starter motor is more than predetermined number. And it becomes possible to avoid contingency situations by prompting the exchange of starter motor toward users. Furthermore, the idling stop controller 1 can specify either case of abnormality of data written in the SRAM 28 or case of the abnormality of data based on EEPROM, by failsafe control mentioned above. Therefore, users are able to correspond to the specified abnormality so that contingency situations are avoided.

Alternative Embodiment

The embodiment in the invention has been described so far. The invention is not limited to the above embodiment but may be applied to various embodiments.

The above embodiments describe that the functions are implemented by a software process performed by a microcomputer operation as a controlling part according to programs; however, a part of functions may be implemented by using a hardware circuit. On the other hand, a part of functions that are implemented by hardware circuit may be implemented by using a software circuit.

For convenience, processes in the flow chart describing the control are illustrated as one system. However, another chart may be used to illustrate that the foregoing controlling part processes each fragmented process in parallel by a multi task control function.

While the invention has been shown and described in detail, the foregoing description is in all aspects illustrative and not restrictive. It is therefore understood that numerous other modifications and variations can be devised without departing from the scope of the invention.

What is claimed is:

1. A controller that controls a controlling subject, the controller comprising:
   a first memory part that stores memory contents while receiving electric power from a power supply;
   a second memory part that stores the memory contents even while not receiving the electric power from the power supply;
   a controlling part that controls the controlling subject by using data stored in the first memory part;
   a backup part that reads the data stored in the first memory part, and that writes the data as backup data in the second memory part;
   a first judging part that judges abnormality of the first memory part;
   a second judging part that judges abnormality of the second memory part based on (1) results of comparing with each other data having a same content written in the second memory part multiple times, and (2) a total amount of the data read out from the second memory part, when the first memory part is judged to be abnormal by the first judging part;
   a third judging part that judges abnormality of the second memory part based on results of comparing the data written in the second memory part with the data read out from the second memory part;
   a writing part that writes the backup data of the second memory part into the first memory part when the second memory part is not judged to be abnormal by the second judging part; and
   a prohibiting part that prohibits control of the controlling subject by the controlling part when the second memory part is judged to be abnormal by both the second judging part and the third judging part.

2. The controller according to claim 1, wherein
   the controller implements an idling stop control through control of an engine, and
   the prohibiting part prohibits the idling stop control.

3. The controller according to claim 2, wherein
the backup part writes down data of a number of times of driving of a starter motor stored in the first memory part, into the second memory part.

4. A controlling method that controls a controlling subject, the method comprising the steps of:
   (a) controlling the controlling subject by using data stored in a first memory part that stores memory contents while receiving electric power from a power supply;
   (b) reading out the data stored in the first memory part, and writing down the data as backup data in a second memory part that stores memory contents even while not receiving the electric power from the power supply;
   (c) judging abnormality of the first memory part;
   (d) judging abnormality of the second memory part based on (1) results of comparing with each other data having a same content written in the second memory part multiple times, and (2) a total amount of the data read out from the second memory part, when the first memory part is judged to be abnormal by the step (c);
   (e) judging abnormality of the second memory part based on results of comparing the data written in the second memory part with the data read out from the second memory part;
   (f) writing the backup data of the second memory part into the first memory part when the second memory part is not judged to be abnormal by the step (d); and
   (g) prohibiting the control of the controlling subject by the step (a) when the second memory part is judged to be abnormal by both the step (d) and the step (e).

5. The controlling method according to claim 4, wherein
the controlling method implements an idling stop control through controlling an engine, and
the step (g) prohibits the idling stop control.

6. The controlling method according to claim 5, wherein
the step (b) writes down data of a number of times of driving of a starter motor stored in the first memory part into the second memory part.

* * * * *